Oct. 16, 1962 S. E. WAHLSTRÖM 3,058,683

TAPE HANDLING DEVICE

Filed Feb. 1, 1960 5 Sheets-Sheet 1

Oct. 16, 1962 S. E. WAHLSTRÖM 3,058,683

TAPE HANDLING DEVICE

Filed Feb. 1, 1960 5 Sheets-Sheet 4

United States Patent Office 3,058,683
Patented Oct. 16, 1962

3,058,683
TAPE HANDLING DEVICE

Sven Erik Wahlström, Enskede, Sweden, assignor to Aktiebolaget Atvidabergs Industrier, Atvidaberg, Sweden, a joint-stock company of Sweden Filed Feb. 1, 1960, Ser. No. 5,875
Claims priority, application Sweden Feb. 9, 1959
5 Claims. (Cl. 242—55.11)

The present invention relates to a storage device including at least one coil having a record tape wound thereon, said coil being adapted to be placed in a fixed winding position, one end of said tape being provided with a weight for guiding this end from the coil when the latter is in said winding position, past a reproducing and recording head to a tape driving device adapted to unwind the tape with high speed.

The primary object of the invention is to enable an arbitrary part of a record tape or the like to be unwound from a coil as rapidly and safely as possible and to reduce the time required for guiding the tape end from the coil to the tape driving device. The invention is mainly characterized by a motor and means for coupling the motor to said coil for assisting the weight to unwind the tape until the tape end has reached said tape driving device and is an improvement over the device disclosed in application Serial No. 767,169 filed October 10, 1958, filed by Stemme and Wahlstrom and assigned to the assignee of the present application.

The attached drawings schematically and as an example illustrate a preferred embodiment of the invention.

Figure 1:
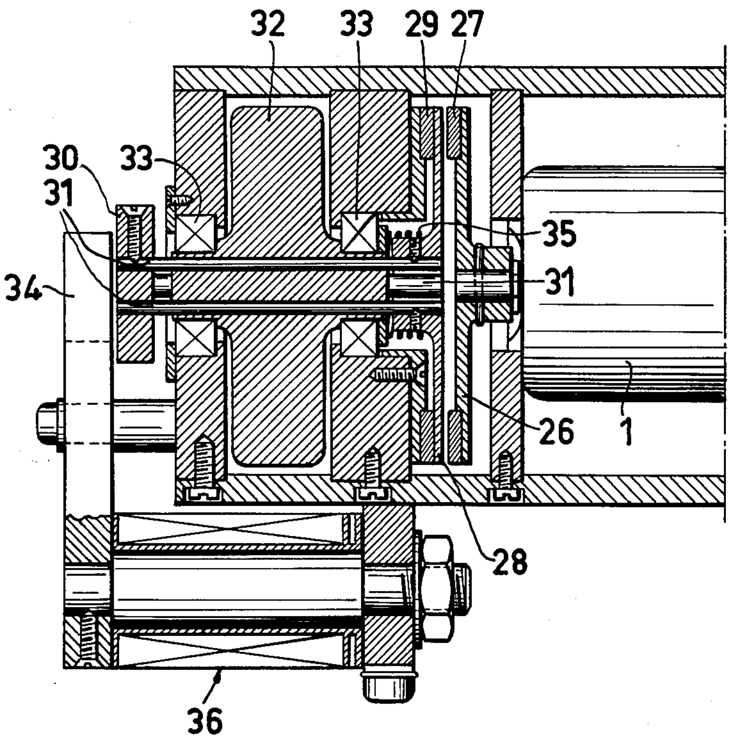
FIG. 1 is a section of a part of a driving device used for winding and unwinding a recording tape on a coil.
Figure 2:
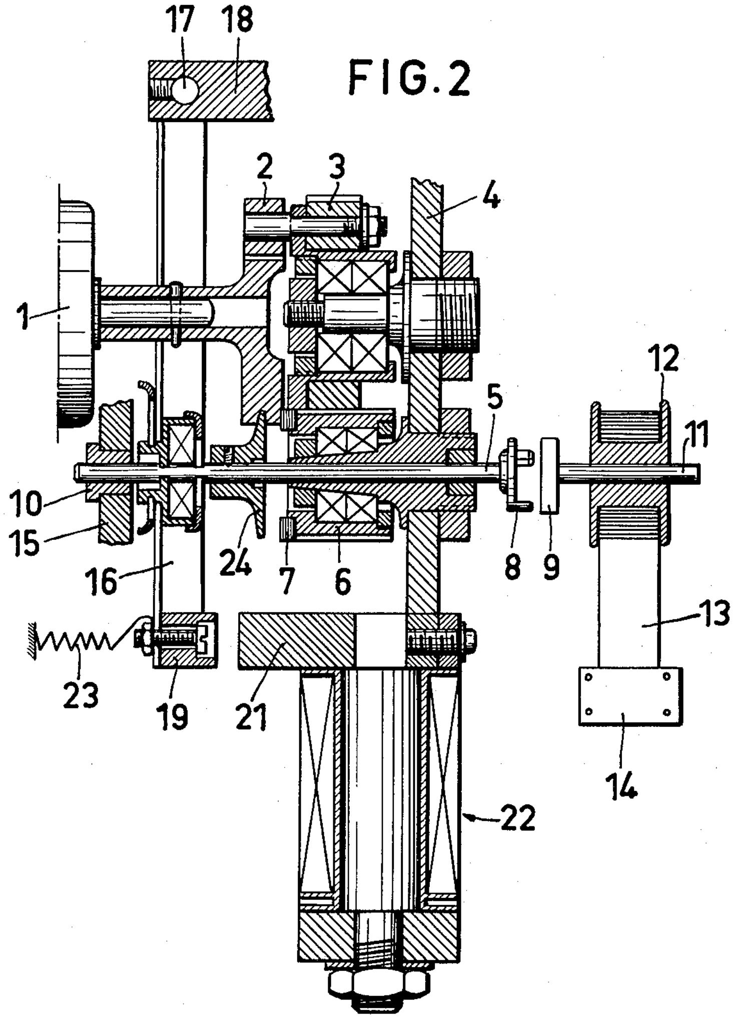
FIG. 2 is a sectional view of the remaining (right) part of the driving device shown partly in FIG. 1.
Figure 3:
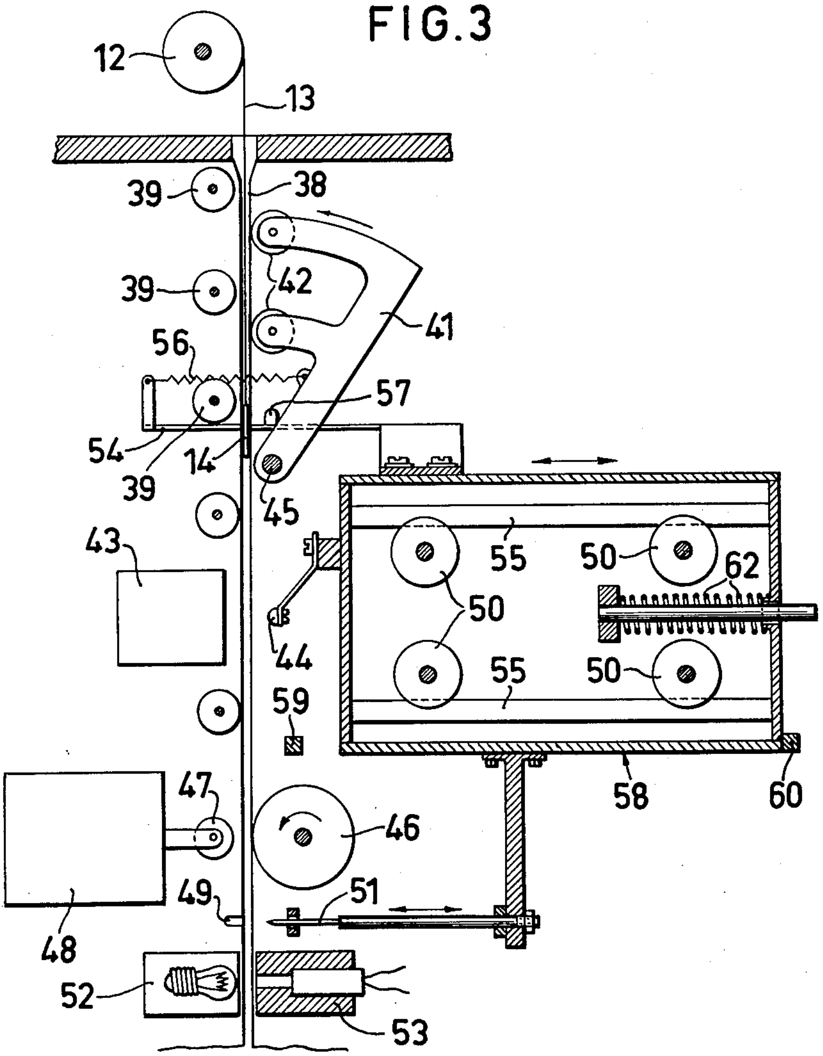
Figure 4:
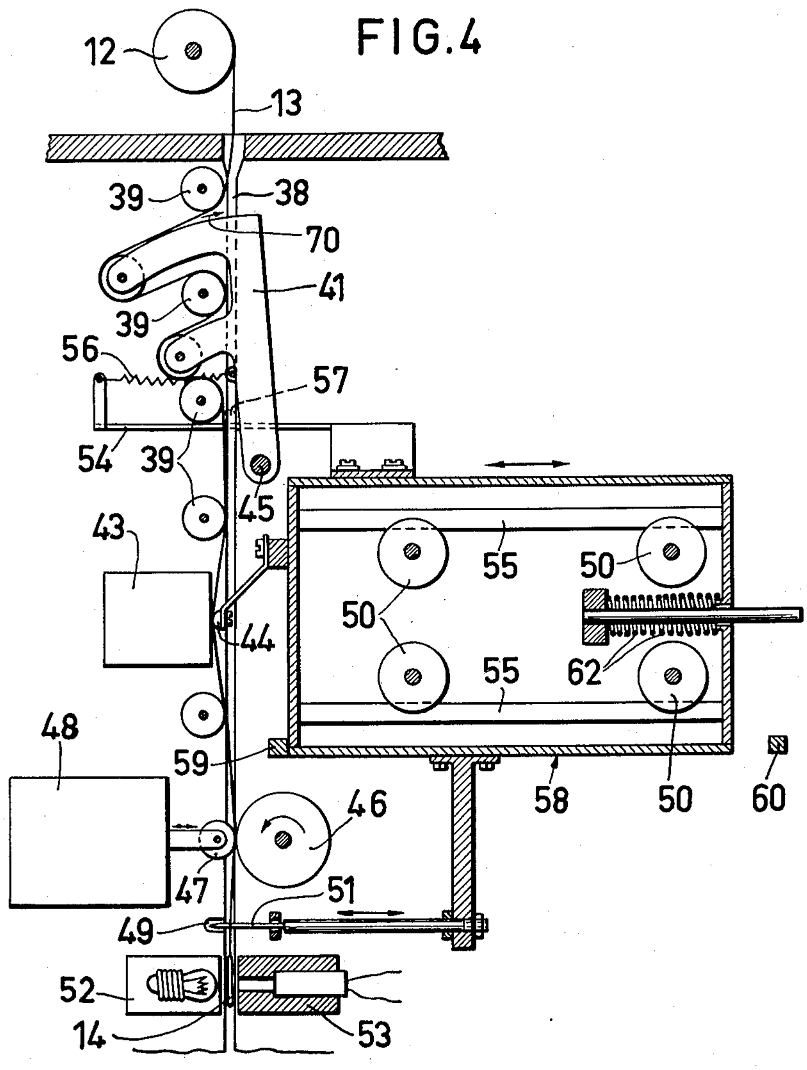

FIGS. 3 and 4 schematically show a number of details of a data storage mechanism including the driving device according to FIGS. 1 and 2, and they particularly visualize the course of events when the driving device according to FIGS. 1 and 2 is disconnected and an additional tape driving device is made operative.

Figure 5:
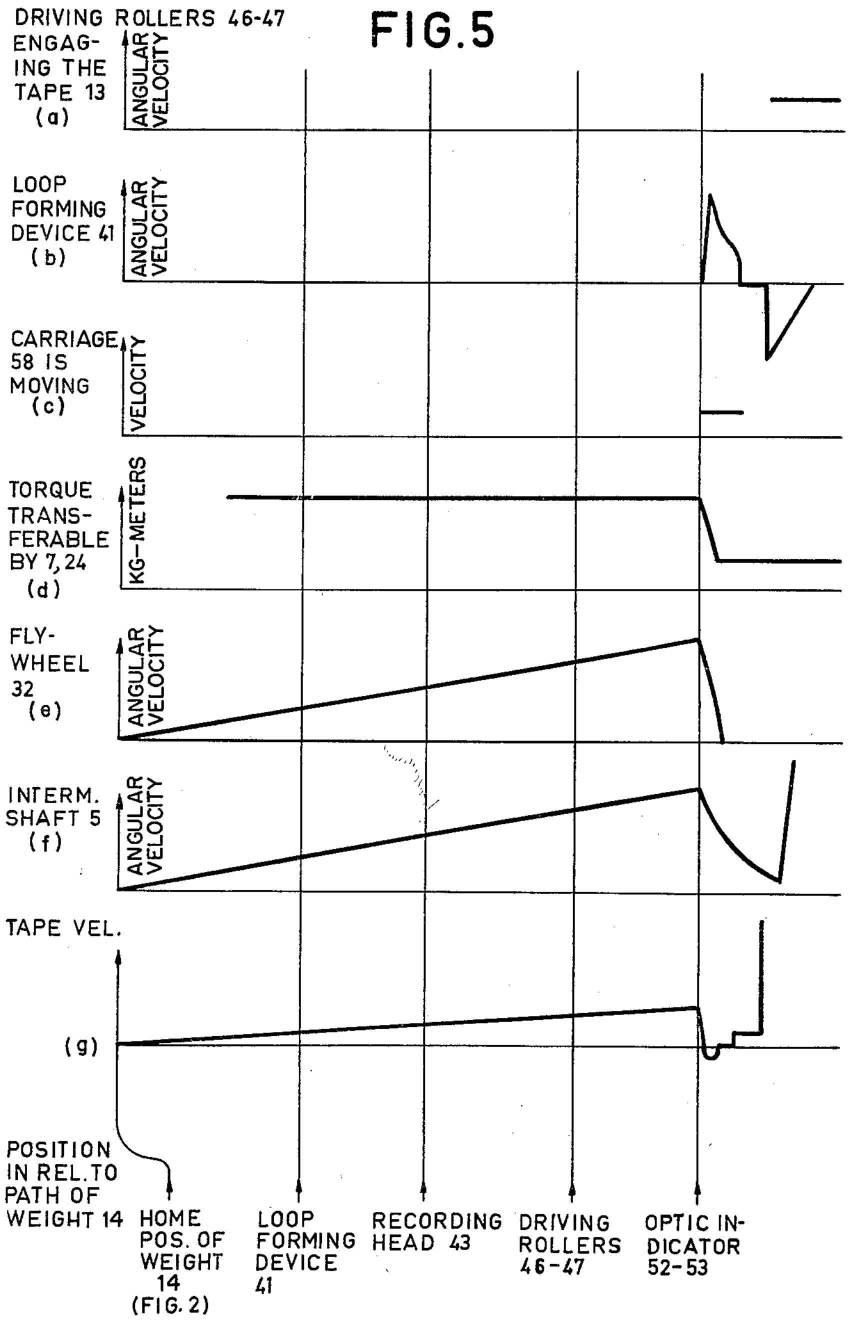

FIG. 5 includes a number of diagrams which are also intended to further illustrate the course of events when the driving devices are changed.

In FIG. 1 and FIG. 2, to the latter of which we first refer, 1 designates an electric driving motor, preferably an asynchronous motor, which by means of a flange coupling 2 drives a gear wheel 3, which is rotatably journalled on a fixed part 4 of a stand or similar device. The gear wheel 3 meshes with a gear wheel 6 which is also rotatably journalled on the stand 4 and coaxially surrounds an intermediate shaft 5 which is freely rotatable and axially displaceable in relation to the gear wheel 6. The end surface of the gear wheel 6 shown to the left in FIG. 2 is provided with a friction layer 7 and the right end of the intermediate shaft 5 is provided with a jaw clutch 8, intended to cooperate with a clutch spring 9 which is attached to one end of a coil or reel supporting shaft 11. As the shaft 5 is directly connected to the coil shaft 11 and rotates together with the latter, the former should have a mass which is as small as possible. A coil or reel 12 is detachably attached to the coil shaft 11 in such a manner that it cannot rotate with respect to the shaft 11. A magnetic tape 13 is wound on the coil 12, and a weight 14 is attached to the free end of the tape.

The left end of the shaft 5 is rotatably and displaceably journalled in a bearing 10 which is attached to a fixed part 15 of the stand. In addition, the shaft 5 is rotatably but not displaceably journalled by a lever 16, which in its turn is pivoted on a journal 17 mounted on a part 18 of the stand and is provided with an armature 19. Said armature 19 cooperates with a pole piece 21 of a solenoid which in its entirety is designated by 22 and is attached to the part 4 of the stand. When the solenoid 22 is energized, the lever 16 rotates counter-clockwise in FIG. 2 causing the shaft 5 to be displaced to the right while overcoming the force of a spring 23. In addition, a clutch flange 24 is mounted on the shaft 5 in such a way that it cannot rotate on the shaft 5 and cannot be substantially displaced in the axial direction. When shaft 5 is displaced to the right in FIG. 2, the jaw clutch 8 will engage the clutch spring 9 on the coil shaft 11 and simultaneously the clutch flange 24 is pressed towards the friction layer 7 with a force which depends on the energizing current of the solenoid 22 thus permitting a certain slipping between the friction layer 7 and the clutch flange 24 under certain circumstances. Thus, it is possible to control the torque transferred between the friction layer 7 and the clutch flange during different steps of the unwinding operation, this being an important feature of the present invention.

During the unwinding operation the motor 1 cooperates with the weight 14 for rotating the coil 12 when a sufficient energizing current flows through the solenoid 22, and the coil is driven in the following manner: motor 1—coupling flange 2—gear wheel 3—gear wheel 6—friction layer 7—clutch flange 24—shaft 5—clutch part 8—clutch part 9—shaft 11—coil 12. The prime purpose of the weight is to draw the tape away from the coil 12 as the motor unwinds it and to guide the tape end past a capstan device 46, 47 which then takes over the unwinding operation.

The motor 1 has a large starting torque and accelerates very fast. Owing to this fact means are provided, according to the invention, for limiting the acceleration of rotation of the shaft 11 to a predetermined value which preferably corresponds to the acceleration of the weight 14 during a substantially free fall under the influence of gravity. A preferred embodiment of said device is shown in FIG. 1. According to this figure the shaft of the motor 1 is provided with a clutch disc 26 provided with a friction layer 27. A further rotatable clutch 28 is arranged coaxially with the clutch disc 26 and cooperates as well with the friction layer 27 of the disc 26 as with a fixed friction layer 29. A pressure spring 35 which engages the left side of the clutch disc 28 steadily biases the clutch disc into engagement with the friction layer 27, so that it will rotate together with the motor 1. Three rods 31 are further fixed to the hub of the disc 28 in the corners of a triangle, and an armature 30 is attached to the opposite end of said rods. The three rods 31 pass through the hub of a flywheel 32 journalled together with the disc 28 by the ball bearing 33 in such a way that the rods 31 can be axially displaced in relation to the flywheel 32 together with the clutch disc 28 and the armature 30. The armature 30 cooperates with two pole pieces 34 of a solenoid, which in its entirety is designated 36, and it bridges the air gap between said pole pieces 34. When the solenoid 36 is energized, corresponding to the state shown in FIG. 1, the armature 30 is attracted by the pole pieces 34 causing the clutch disc 28 to be pressed against the fixed friction layer 29 while counteracting the force of the spring 35, and in this way the disc is braked to stop instead of being forced against the friction layer 27 rotating together with the shaft of the motor 1 and the disc 26. During the unwinding of the first part of the tape 13 (FIG. 2) when the coil shaft 11 is accelerating, the flywheel 32 (FIG. 1) is thus connected to the shaft of the motor 1 by means of the action of the spring 35 and the acceleration of the coil shaft is kept below a predetermined value (suitably the acceleration of gravity as stated above). When a certain phase of the unwinding operation as hereinafter described has been reached the flywheel 32 is disengaged from the motor 1 by energization of the solenoid 36 causing the clutch disc 28 to be forced against the fixed friction layer 29 and to be stopped together with the fly-wheel 32.

FIGS. 3 and 4 disclose in greater detail how the tape 13 is unwound from the coil 12, and they show two successive steps of the unwinding operation, FIG. 3 relating to a step occurring prior to that shown in FIG. 4. FIGS. 3 and 4 show the coil 12, the tape 13 and the weight 14, the vertical motion of which, during the unwinding of the tape, is guided by a track 38 in which the marginal end portions of the weight projecting outside the tape will run. Along the track 38 three guide rollers 39 are arranged opposite to a loop forming device 41, which is provided with two guide rollers 42 cooperating with the guide rollers 39. Below the guide rollers 39 and the loop forming device 41 there is located a magnetic head 43, cooperating with a tape supporting member 44. Below the above-mentioned elements there is a tape driving device, comprising a capstan 46 and a pressure roller 47 which in the operative position presses the tape 13 against the continuously rotating capstan 46. A solenoid 48 is provided for pressing the roller 47 into driving relation with the capstan at a predetermined time in the unwinding operation as is described more in detail hereinafter. Below the tape driving device there are two recesses 49 in one wall of the track 38 and the prongs of a fork 51 can be put into said recesses on each side of the tape 13 as is further later described. Below the components described above there is finally an optical indicator comprising a light source 52 arranged on one side of the track 38 and a photoelectric cell 53 arranged on the opposite side, said photoelectric cell being illuminated by the light source 52 when the first part of the tape 13 is unwound.

The fork 51, the tape supporting member 44 and an arm 54, which by means of a tension spring is connected to the loop forming device 41, which continuously engages a lug 57 on the arm 54, are carried by a carriage which in its entirety is designated 58. The carriage 58 moves on wheels 50 which can roll on fixed rails 55 between two stops 59 and 60 under the influence of a feeding solenoid, not shown, which pulls the carriage 58 towards the left (from the position shown in FIG. 3 to the position shown in FIG. 4) and a return spring 62 which returns the carriage to its home position.

FIG. 3 shows the loop forming device 41 which is pivoted on a journal 45, the carriage 58 with the tape supporting member 44 and the fork 51 as well as the pressure roller 47 of the tape driving device in the positions which they hold when the first part of the tape 13 has been unwound and before the weight 14 has reached the optical indicator 52—53 and interrupted the light beam from the light source 52 to the photo-electric cell 53. In FIG. 3 the weight 14 is shown to have reached a point opposite the arm 54.

In FIG. 4 the weight 14 has interrupted the light beam from the light source 52 to the photoelectric cell 53. This causes the motor 1 (FIGS. 1 and 2) to receive a stop signal, and the torque, which is transferred by the friction clutch 7, 24, can be reduced to a value which is only sufficient to keep the tape 13 stretched during the continuing unwinding operation by reducing the current through the solenoid 22. Interruption of the beam also causes the solenoid 36 to be energized so that the clutch disc 28 is urged towards the fixed friction layer 29 thus quickly stopping the flywheel 32, and causes the carriage 58 to be moved to the left end position shown in FIG. 4. During this operation the fork 51 will first enter the recesses 49 for preventing the loop forming device 41 from lifting the weight 14 during the counterclockwise rotation thereof on the journal 45, and the tape supporting member 44 will be moved towards the magnetic head 43. When the carriage 58 has reached the left end position shown in FIG. 4 the motor 1 is substantially stopped but the coil 12 is rotated slightly further owing to the inertia and the unwinding action of the loop forming device 41 caused by the fact that the weight 14 is retained by the fork 51. When the motor is deenergized, it is not completely braked before the capstan device takes over the feeding of the tape. It will rotate by inertia to rotate the coil 12 through the reduced friction of clutch 7, 24 as the clutch parts are being disengaged.

The loop forming device 41 can be rocked in the clockwise direction from the advanced position shown in FIG. 4 as indicated by the arrow 70, while overcoming a certain resistance from pneumatic damping means which are not shown in the drawing. The damping means are so designed that their resistance to the clockwise rotation of the loop forming device 41 is initially comparatively small but after a small rotation increases to a value substantially proportional to the rotational velocity. The main purpose of the loop forming device in this design is to decrease the tension in the tape 13 when the pressure roller 47 during the following step of the unwinding operation is moved to the right (from the position shown in FIG. 3 to the position shown in FIG. 4) and urges the tape 13 against the capstan 46 which is rotating with a high speed causing the tape to be quickly accelerated. The tape 13 is urged towards the capstan when the carriage 58 has reached its left end position.

The circumferential velocity of the capstan 46 is, in the embodiment described, five meters per second which is substantially more than the maximum velocity of the tape during the phase of the unwinding operation described above, and the problem is now to give the coil 12, which is substantially standing still at the moment when the pressure roller 47 is beginning to urge the tape 13 towards the capstan 46, a kinetic energy of the magnitude of one kilogram-centimeter corresponding to a tape velocity of five meters per second without exceeding the allowable maximum tension in the tape, in this case 0.3 kilogram. This is realized by means of the loop forming device 41, which in the embodiment shown forms two loops which cause the tension of the tape to be reduced substantially to one quarter compared with a straight tape. The loop forming device must take up a tape length of about 3–4 centimeters to be able to supply said kinetic energy at a tension of 0.3 kilogram, but owing to other circumstances, the loop forming device is designed to take up a total tape length of about 10 centimeters. However, not only the coil 12 but also the loop forming device 41 must be accelerated and thus the mass of the latter must be as small as possible.

At the time of operation at which the parts are positioned as illustrated in FIG. 4, the tape driving device 46—47 has just begun to feed the tape which, however, has only moved a few millimeters under the influence of said device. The jerk in the tape is absorbed by the loop forming device 41 which is rocked clockwise in the direction of the arrow 70 as the loops of the tape 13 are straightened out. The motion of the loop forming device 41 in the clockwise direction is comparatively fast during the first part of the acceleration due to tension on the tape, since the rotational velocity of the coil is low but it is rapidly retarded as the rotational velocity of the coil is increased which effectively decreases its tension. This occurrence takes place very rapidly and the acceleration exceeds the acceleration of gravity, causing the weight 14 to be without influence on the unwinding of the tape 13 in the following steps. During the following part of the unwinding operation, the tape runs over the guide rollers 39 and 42 and forms a pair of small bends.

FIGS. *5a* through *5g* are self-explanatory and show a plurality of diagrams, which describe the operation of some of the most essential parts when the tape driving means are changed, i.e. when the motor 1 and the weight 14 are replaced as a source for winding off the tape 13 by the capstan drive 46, 47. In the last three diagrams of FIG. 5 the scale of the ordinate is logarithmic. FIGS.

*5a, 5b, 5c, 5e, 5f* and *5g* show the variations in velocity of the respective elements as the weighted end of the tape reaches positions relative to these and other elements of the device. FIG. *5d* illustrates the variations in the torque transferrable by friction clutch parts 7, 24.

The embodiment described above and shown in the drawings is only to be considered as a non-limiting example, and the details thereof can be modified in several ways within the scope of the following claims.

What I claim is:

1. In a tape handling device having means for supporting a reel of tape for rotation on a horizontal axis, a weight secured to the free end of the tape, a rotatable capstan below the axis of the reel for feeding the tape, movable pressure means for positioning the tape against the capstan, means for rotating the reel when the tape is fully wound on the reel to unwind the tape to permit its weighted end to freely move by gravity to the capstan, and means operated by the free end of the tape as it passes the capstan to control movement of the pressure means to position the tape against the capstan and to render inoperative the means for rotating the reel.

2. In a tape handling device according to claim 1, including means for guiding the free end of the tape toward the capstan.

3. In a tape handling device according to claim 1, in which the means for rotating the reel to unwind the tape comprises a motor and movable clutch means between the motor and reel.

4. In a tape handling device according to claim 3, including a flywheel, second clutch means normally coupling the flywheel to the motor for limiting the acceleration of the motor during starting to a value such that the tape is unwound by the motor with an acceleration which does not exceed the acceleration of gravity and further means operated by the free end of the tape as it passes the capstan to operate the second clutch means to disconnect the flywheel from the motor.

5. In a tape handling device according to claim 3 including a flywheel driven by the motor for limiting the acceleration thereof during starting to a value such that the tape is unwound with an acceleration not exceeding the acceleration of gravity.

References Cited in the file of this patent

UNITED STATES PATENTS

| | | |
|---|---|---|
| 2,627,414 | Sear | Feb. 3, 1953 |
| 2,877,012 | Angel et al. | Mar. 10, 1959 |
| 2,891,736 | Blaes | June 23, 1959 |